United States Patent [19]

Laing

[11] 4,087,708
[45] May 2, 1978

[54] CASING FOR MOTORS HAVING A SPHERICAL AIR GAP

[76] Inventor: Nikolaus Laing, Hofener Weg 35-37, 7141 Aldingen, Germany

[21] Appl. No.: 721,560

[22] Filed: Sep. 8, 1976

[30] Foreign Application Priority Data

Sep. 17, 1975 Germany ............................ 2541500

[51] Int. Cl.$^2$ ............................................. H02K 5/18
[52] U.S. Cl. .................................................. 310/64
[58] Field of Search ................. 310/157, 166, 268, 89, 310/52, 64, 217, 218, 87, 216

[56] References Cited

U.S. PATENT DOCUMENTS

| | | | |
|---|---|---|---|
| 2,735,027 | 2/1956 | Formhals et al. | 310/64 X |
| 3,155,856 | 11/1964 | Macha et al. | 310/64 X |
| 3,158,767 | 11/1964 | Schoning | 310/157 X |
| 3,508,092 | 4/1970 | Hallidy | 310/64 |
| 3,814,963 | 6/1974 | Laing | 310/166 X |

*Primary Examiner*—Mark O. Budd
*Attorney, Agent, or Firm*—Pennie & Edmonds

[57] ABSTRACT

The invention is concerned with a motor for driving a centrifugal pump. The motor comprises a cylinder of circumferentially spaced axially disposed stator teeth; a stack of laminations forming a magnetic return path between the ends of the stator teeth at one end of the cylinder; a rotor in the form of a spherical segment which together with the other ends of the stator teeth defines a part spherical air gap at the other end of the cylinder; and a motor casing formed of a heat and electrically conducting non-magnetic material which radially encloses the stator teeth. The motor further comprises segments formed of a heat and electrically conducting non-magnetic material which are interleaved with the stator teeth and connected in a heat conducting manner to the casing and secured thereto against axial movement away from the rotor; the ends of the segments adjacent the rotor also define said part-spherical air gap with said rotor.

At least one plane surface may be provided on the inside of the casing for supporting and making heat conducting contact with at least one of a set of axially spaced coil windings of the motor. At least some of the segments may support and make heat conducting contact with at least one of the set of coil windings and the casing and segments may be an integral structure.

5 Claims, 4 Drawing Figures

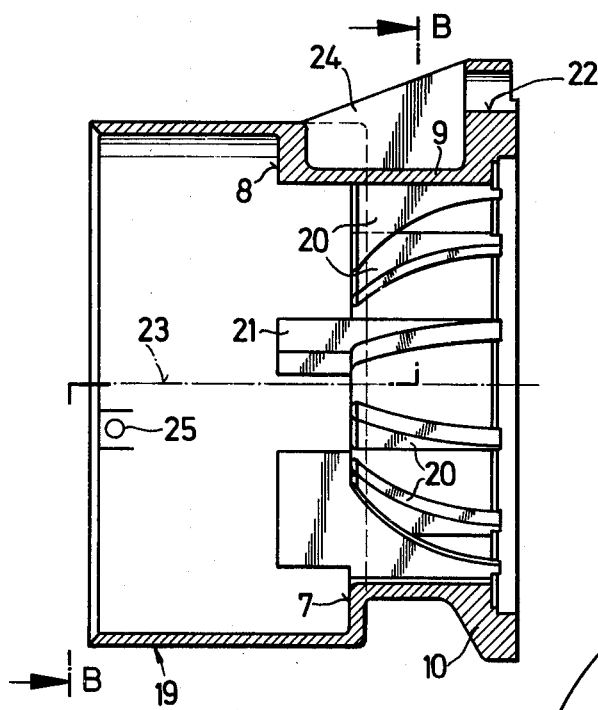
Fig. 2a (A-A)
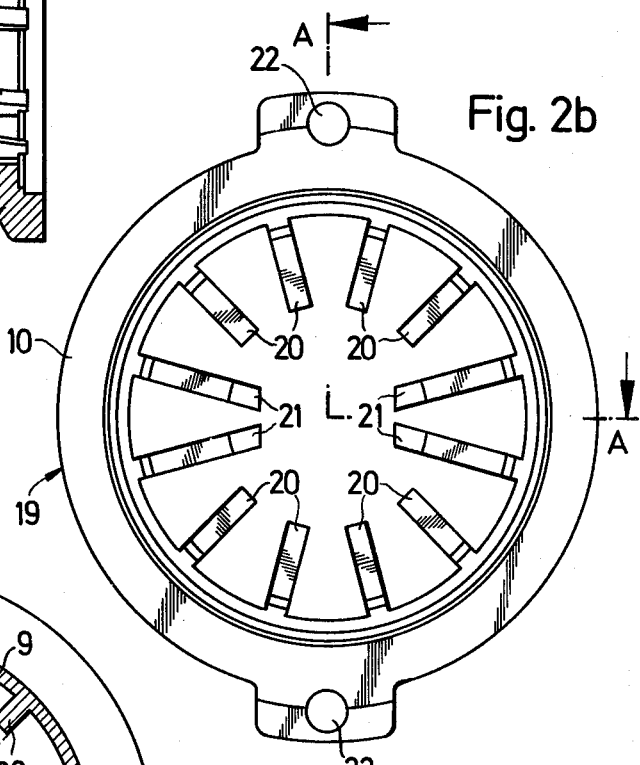
Fig. 2b
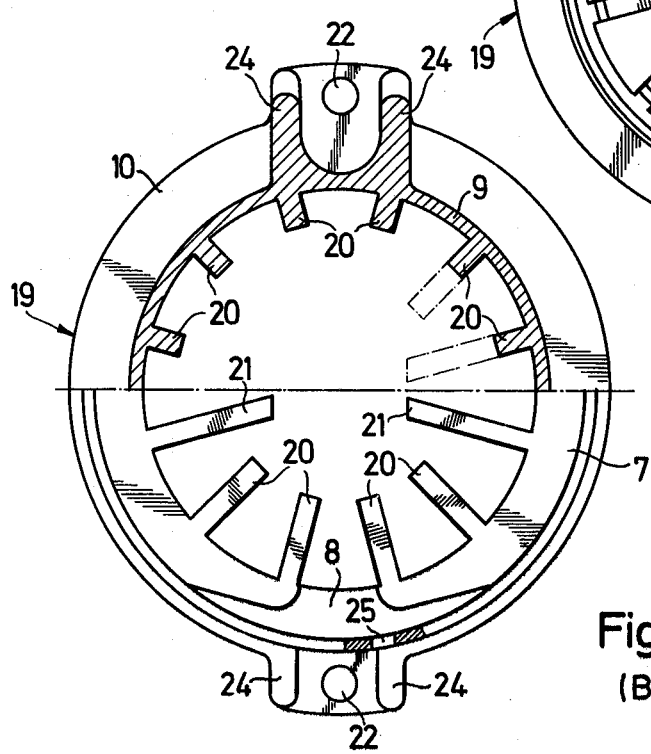
Fig. 2c (B-B)

CASING FOR MOTORS HAVING A SPHERICAL AIR GAP

The Prior Art

Motors having a part-spherical air gap do not need conventional shafts and bearing bushes and they are therefore frequently used for driving pumps. However, in such applications practice has shown that notwithstanding the considerable advantages they possess in not having a conventional shaft, they also suffer from major drawbacks. These are 1. that in two-pole arrangements magnetic leakage from the coil windings far exceeds that occurring in comparable cylindrical motors;
2. that the soft iron teeth between the coil windings and the part-spherical air gap cause a much greater degree of magnetic leakage than that in comparable cylindrical motors because of the greater surface area in each axial plane;
3. that difficulties arise in grounding the magnetic sheet iron laminations because unlike cylinder motors they do not form an assembly that is metallically connected to the metal casing. The contact existing between the several laminations which constitute the iron core of the stator is relatively unreliable;
4. that the abstraction of heat from the coil windings is difficult for the same reasons because the coil windings which in a cylindrical motor are received into the slots and are therefore in good thermal contact with the iron of the stator, make little contact with the teeth in a motor having a partspherical air gap, and also because the laminations define wedge-shaped intervening spaces which prevent transverse electrical conduction;
5. that the abstraction of heat from the coil windings located on that side of the stator which is remote from the rotor presents particular difficulties because the path length for conducting the heat from this coil to the opposite heat dissipating side of the motor is very long, and
6. that the transmission of hydraulic pressure to the sealing membrane or partition between stator and rotor is through the soft iron teeth in the form of an axial thrust, whereas the comparable sealing element in a cylinder motor, namely the encapsulating gap tube, is supported by the stator laminations and can therefore absorb pressures of any magnitude occurring in normal practice.

Object of the Invention

It is therefore an object of the invention to eliminate these drawbacks by providing a casing of novel design.

Description of the Invention

The casing of a motor according to the invention consists of a non-magnetic material that is nevertheless a good conductor of electricity. It comprises a ring portion which embraces the coil windings, and which therefore suppresses magnetic leakage from the coil windings. Leakage from the coil windings is reduced to a minimum.

For reducing leakage between the soft iron stator teeth the invention provides segments extending at right angles to the leakage flux lines. This gives a substantial reduction of magnetic leakage at the teeth to the level of the usual leakage from the crests of the teeth in a cylindrical motor. An annular portion embracing the teeth between coil winding and rotor suppresses the leakage flux lines which extend outwards from the end faces. This also reduces the effects of the drawback listed above under point 2.

In order to afford protection against accidental electrical shock the proposed motor casing is closed on the side remote from the rotor by an insulating member and provided with an earthing terminal. This eliminates the drawback of point 3.

The removal of heat from the coil windings adjacent the rotor is effected in that the axial surfaces of the coil windings extending towards the rotor bear against a flat peripheral portion of the motor casing and on the segments, thereby ensuring the transmission of heat to the pump chamber. For cooling the auxiliary coil winding the invention provides indentations in the casing wall terminating in flat faces against which some of the auxiliary coil windings bear. Moreover, some segments are extended as far as the plane between the two coil windings, permitting the heat generation in the auxiliary coil windings to be likewise abstracted to the pump chamber. This eliminates the drawback of point 4.

In order to take up the hydrostatic forces which act on the sealing membrane or partition in the air gap the invention avails itself of radial segments whose ends define a part-spherical surface. They may be the same segments provided for suppressing magnetic leakage from the teeth. They are embraced by a thick-walled ring part of the housing which ensures the abstraction of heat from the coil windings and from the teeth to the pump casing, and which simultaneously prevents distortion of the casing by the action of the hydrostatic thrust on the spherically cup-shaped partition.

Brief Description of the Drawings

FIG. 2a is a separate section of the motor casing taken on the line A — A in FIG. 2b,
FIG. 2b is a view of the motor casing from underneath, i.e. from the right hand side in FIG. 2a, and FIG. 2c is a section taken on the line B — B in FIG. 2a.

Description of the Preferred Embodiment

Figure 1:
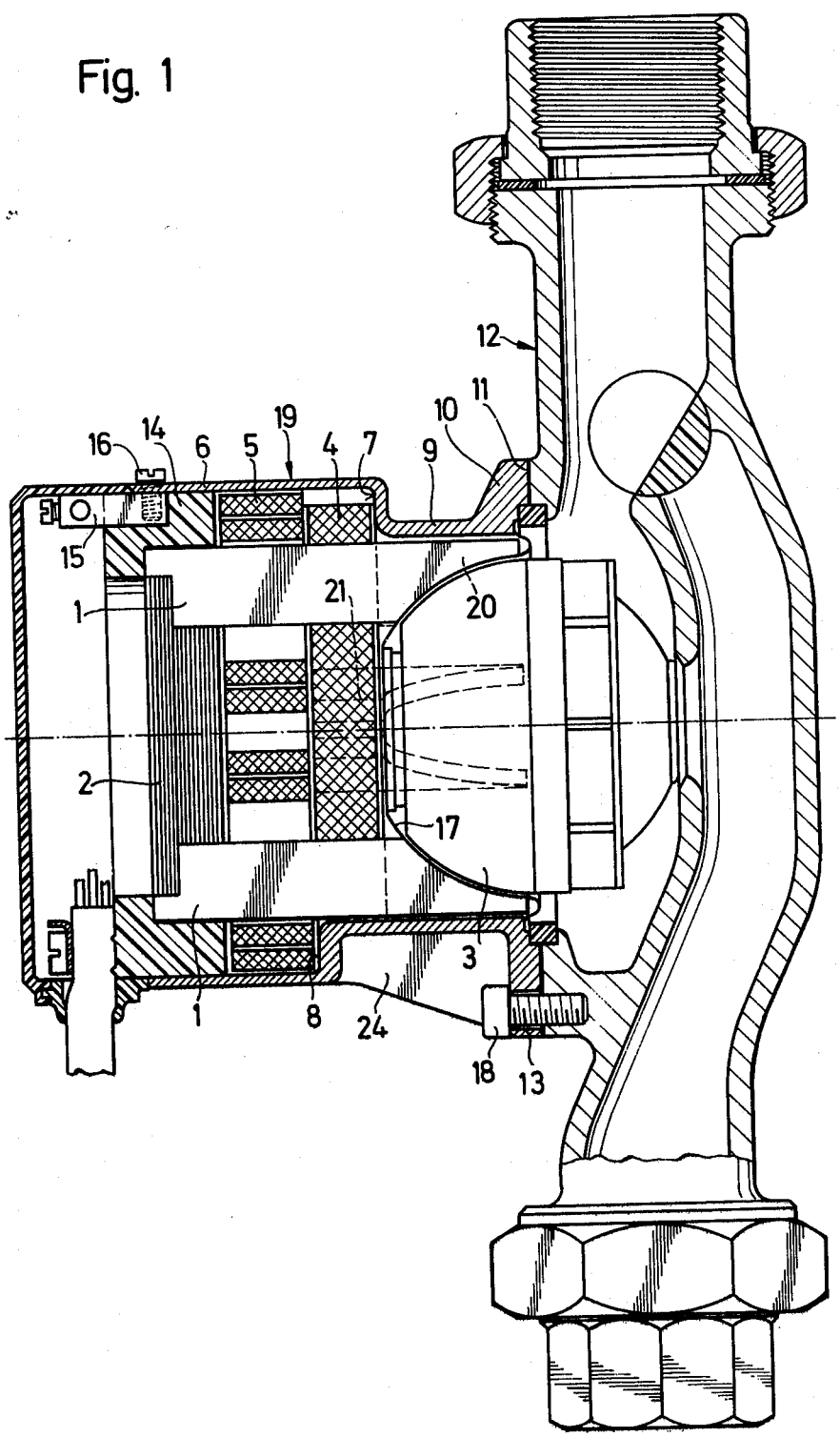
FIG. 1 is a section of a pump and motor casing.

The stator teeth 1, the laminations 2 which form a magnetic return path, and the rotor 3 together constitute the magnetic circuit. The principal coil windings 4 are located at the end nearest the rotor, whereas the auxilliary coil winding 5 are at the further end. For suppressing magnetic leakage from the coil windings the cylindrical part 6 of the casing which consists of a non-magnetic metal, preferably aluminium, embraces both coil windings. A flat peripheral face 7 formed by the neck portion comprises a first radially extending plane portion which cools the coil windings 4 nearest the rotor, whereas cooling of the upper coil windings 5 is effected by faces 8 on opposite sides forming a second radially extending plane. Moreover, the cylindrical part 19 of the casing embraces the length of both sets of coil windings 4 and 5 and thus also serves to dissipate heat and to suppress magnetic leakage in the neighbourhood of the coil windings 4 and 5. Leakage at the stator teeth is suppressed partly by an annular region 9 which closely embraces the teeth. The heat flux from the coil windings passes partly through the teeth 1 but for its greater part through the casing 6, 19, 9 into the reinforcing ring 10 which makes good thermal contact with the pump casing 12 at the joint 11. This annular region 9 together with the ring 10 forms a flange with lugs 13 for bolting the motor to the pump casing 12 by screws 18. At the end remote from the rotor the teeth 1 and the laminations 2 are held together by a plastic ring 14. Embedded in this plastics ring is a contact member 15 into which a screw 16 projects for reliably elecrically connecting the casing 6 to a ground terminal 15 and at the same time axially locating the plastics ring 14 and hence the entire stator 1, 2, 4 and 5. Segments 20 extend into the gaps between the teeth 1 and simultaneously suppress magnetic leakage from the teeth 1 and support the hydrostatically loaded partition 17, besides serving to remove heat from the coil windings 4. Extensions 21 of some of the segments which are integral with the annular region 9 pass through the coil windings 4 as far as the plane between coil winding 4 and 5, and thus assist in removing dissipative heat from the coil windings 5. FIGS. 2a and 2c illustrate the same casing as that shown in FIG. 1. In these drawings the segments 20 between the teeth 1 below coil windings 4 for suppressing the leakage flux are also visible. The extensions 21 project between the coil windings 4 as far as the plane between coil windings 4 and 5. This plane coincides with the plane of face 8 so that the coil windings 5 are provided with a good heat conducting connection to the liquid contacting region of the pump. The neck 9 serves not only for suppressing leakage flux and for the creation of a heat dissipating face 8 but also permits the holes 22 in the flange to be located as closely as possible to the centre axis 23 so that in conjunction with webs 24 the strength of the structure for a given expenditure in material is high and the loads at a given hydraulic pressure are low, in accordance with the smaller diameter. The ground screw 16 projects through an opening 25. The teeth 1 extend between the segments 20 to the partition 17. If the partition 17 were supported exclusively by the stator teeth 1 the static pressure in the pump casing 12 might dislocate the stator 1, 2, 4 and 5 and cause the destruction of the motor. The leakage suppressing segments 20 and 21 transmit this hydraulic force to part 9 of the casing and through ring 10 to the flange 22 thus permitting the casing to absorb the axial hydraulic thrust.

What I claim:

1. A motor casing for enclosing a spherical motor where the motor has a stator comprising an annulus of axially disposed circumferential teeth, axially spaced principal and auxiliary coil windings, a stack of laminations forming a magnetic return and a rotor in the form of a spherical segment which together with the stator defines a spherical air gap; the improvement comprising in that said casing comprises a cylindrical shaped part of a non-magnetic material having a neck portion of reduced diameter at one end, in that said neck portion has a flange adapted to be attached to a pump casing, in that a plurality of circumferentially spaced segments are located within and integral with said cylindrical shaped part to extend between the circumferentially spaced teeth and which define a spherical surface facing the air gap, in that said reduced neck portion forms a radially extending first plane for engaging with and axially positioning the principal coil windings and in that said cylindrical part has a radially extending second plane portion for engaging with and axially positioning the auxiliary coil windings whereby heat from said coil windings may be conducted through said cylindrical part to said neck and flange portions.

2. A motor casing according to claim 1 wherein some of said segments project between said principal coil windings and terminate at said second plane.

3. A motor casing according to claim 1 having in addition a ring concentrically positioned in the casing and holding together the axially disposed teeth, the stack of laminations and the coil windings.

4. A motor casing according to claim 3 having in addition a screw adapted to be electrically connected to ground and which acts to position the ring in the casing.

5. A motor casing according to claim 1 wherein said neck portion engagingly embraces portions of the teeth extending axially beyond the coil windings.

* * * * *